United States Patent
Kutsuna et al.

(10) Patent No.: US 7,425,598 B2
(45) Date of Patent: *Sep. 16, 2008

(54) ADHESIVE OF EPOXY RESIN AND CURING AGENT WITH XYLYLENE DIAMINE STRUCTURE

(75) Inventors: Takaaki Kutsuna, Kanagawa (JP); Shuta Kihara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 10/488,684

(22) PCT Filed: Sep. 3, 2002

(86) PCT No.: PCT/JP02/08920

§ 371 (c)(1),
(2), (4) Date: Sep. 8, 2004

(87) PCT Pub. No.: WO03/022952

PCT Pub. Date: Mar. 20, 2003

(65) Prior Publication Data
US 2005/0014908 A1   Jan. 20, 2005

(30) Foreign Application Priority Data
Sep. 5, 2001  (JP) .............................. 2001-269073

(51) Int. Cl.
*C08L 63/00*  (2006.01)

(52) U.S. Cl. .................. 525/531; 525/481; 525/526

(58) Field of Classification Search .................. None
See application file for complete search history.

(56) References Cited

U.S. PATENT DOCUMENTS

| | | | | |
|---|---|---|---|---|
| 3,683,044 A * | 8/1972 | Huang et al. ................ 525/526 |
| 5,728,439 A * | 3/1998 | Carlblom et al. ......... 428/36.91 |
| 6,746,772 B2 * | 6/2004 | Kashiba et al. ............. 428/414 |
| 6,861,147 B2 * | 3/2005 | Kutsuna et al. ............. 428/416 |
| 7,271,224 B2 * | 9/2007 | Kutsuna et al. ............. 525/423 |
| 2002/0120063 A1 * | 8/2002 | Kutsuna et al. ............. 525/107 |
| 2005/0158494 A1 * | 7/2005 | Koyama et al. ............ 428/35.7 |

FOREIGN PATENT DOCUMENTS

| | | |
|---|---|---|
| EP | 1 219 656 | 7/2002 |
| EP | 1 270 206 | 1/2003 |
| GB | 2112388 A * | 7/1983 |
| JP | 57-80470 | 5/1982 |
| JP | 63-301264 A * | 12/1988 |
| JP | 8-104738 A * | 4/1996 |
| WO | WO 95/26997 | 10/1995 |
| WO | WO 96/18669 | 6/1996 |
| WO | WO 99/60068 | 11/1999 |

OTHER PUBLICATIONS

CAPLUS accession No. 1973:4989 for Japanese Patent No. 47-30640 B4, Asahara et al., Aug. 9, 1972.*

* cited by examiner

*Primary Examiner*—Robert Sellers
(74) *Attorney, Agent, or Firm*—Antonelli, Terry, Stout & Kraus, LLP.

(57) ABSTRACT

The present invention provides an adhesive for laminates containing, as a main component, an epoxy resin composition comprising an epoxy resin and an epoxy resin-curing agent, the epoxy resin composition being formed into an epoxy resin cured product containing a skeleton structure represented by the formula (1):

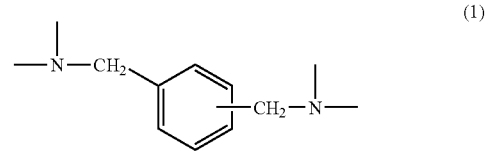

(1)

in an amount of at least 40% by weight. Since the adhesive of the present invention reveals not only a suitable adhesion to various film materials but also a high gas-barrier property, only a single layer formed therefrom can realize both an excellent gas-barrier property and an excellent adhesion property in combination, so that it is possible to produce a high gas-barrier laminated film for a packaging material without forming a separate gas-barrier layer therein.

4 Claims, No Drawings

ADHESIVE OF EPOXY RESIN AND CURING AGENT WITH XYLYLENE DIAMINE STRUCTURE

TECHNICAL FIELD

The present invention relates to an adhesive for laminates which have a high gas-barrier property and a suitable adhesion to film materials such as various polymers, papers and metals, as well as a laminated film, a multi-layer packaging material and a packaging bag using the adhesive.

BACKGROUND ART

In recent years, packaging materials have been predominantly prepared from composite flexible films made of different kinds of polymer materials in combination because of their strength, goods-protecting property, workability, advertising effects provided by printing or so, etc. The composite flexible films are generally constituted from a thermoplastic resin film, etc., which serves an outer layer for protecting goods, and another thermoplastic resin film, etc., which serves as a sealant layer. These layers are laminated together by a dry-lamination method in which the sealant layer is bonded to a laminated film layer through an adhesive applied to the laminated film layer, or by an extrusion lamination method in which a melt-extruded plastic film as the sealant layer is pressure-stuck with the laminated film layer which may be optionally coated with an anchor coat agent, thereby laminating the sealant layer over the laminated film layer in a form of film. In these methods, two-part liquid polyurethane-based adhesives that are generally composed of a main ingredient comprising an active hydrogen-containing group such as hydroxyl group, and an isocyanate group-containing curing agent, have been predominantly used as the adhesives in view of a high adhesion property thereof (for example, refer to Japanese Patent Application Laid-open Nos. Hei 5-51574 and Hei 9-316422, etc.).

However, these two-part liquid polyurethane-based adhesives generally exhibit a slow curing reaction rate. Therefore, in order to ensure a sufficient adhesion property of the two-part liquid polyurethane-based adhesives, the resultant laminated film must be aged for a long period of time, e.g., 1 to 5 days after the lamination, for promoting the curing reaction. Also, since the curing agent comprising isocyanate groups is used in the two-part liquid polyurethane-based adhesives, when residual unreacted isocyanate groups are present therein after curing, there may occur problems such as generation of bubbles in the resultant laminated film which is attributed to carbon dioxide formed by the reaction between the residual unreacted isocyanate groups in the adhesives and moisture in atmospheric air.

On the other hand, in order to overcome the above problems, Japanese Patent Application Laid-open No. 2000-154365 has proposed polyurethane-based adhesives, and WO 99/60068 has proposed epoxy-based adhesives for laminate.

However, the above polyurethane-based adhesives as well as the epoxy-based adhesives proposed in WO 99/60068 reveal a low gas-barrier property. Therefore, when these adhesives are employed for packaging materials requiring a high gas-barrier property, it is necessary to separately laminate additional various gas-barrier layers such as a PVDC coating layer, a polyvinyl alcohol (PVA) coating layer, an ethylene-vinyl alcohol copolymer (EVOH) film layer, a m-xyleneadipamide film layer and an inorganic deposited film layer on which alumina ($Al_2O_3$), silica (Si) or the like is vapor-deposited, which results in high production costs of laminated films or disadvantageous laminating processes.

DISCLOSURE OF THE INVENTION

An object of the present invention is to provide an adhesive for gas-barrier laminates which exhibit a high gas-barrier property and to provide the adhesive having an excellent adhesion property to various polymers, papers, metals, etc., as well as a gas-barrier laminated film using the adhesive.

As a result of extensive researches for overcoming the above problems, the present inventors have found that an adhesive composed mainly of a specific epoxy resin composition exhibits not only a high gas-barrier property but also a suitable adhesion property to various polymers, papers, metals, etc. The present invention has been accomplished on the basis of this finding.

That is, the present invention provides an adhesive for laminates containing as a main component, an epoxy resin composition comprising an epoxy resin and an epoxy resin-curing agent, the epoxy resin composition being formed into an epoxy resin cured product containing a skeleton structure represented by the formula (1):

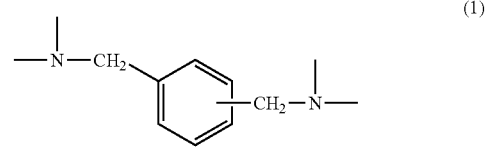

in an amount of at least 40% by weight. The present invention also provides a laminated film, a multi-layer packaging material and a packaging bag using the adhesive.

PREFERRED EMBODIMENTS TO CARRY OUT THE INVENTION

The adhesive for laminates according to the present invention contains as a main component, an epoxy resin composition including an epoxy resin and an epoxy resin-curing agent. The epoxy resin cured product formed from the epoxy resin composition contains the skeleton structure represented by the above formula (1) in an amount of at least 40% by weight, preferably at least 45% by weight and more preferably at least 50% by weight. The high-level content of the skeleton structure represented by the formula (1) in the epoxy resin cured product forming an adhesive layer enables the resultant laminated film to reveal a high gas-barrier property. First, the epoxy resin and the epoxy resin-curing agent which form the epoxy resin cured product are explained below.

(Epoxy Resin)

The epoxy resin used in the adhesive for laminates according to the present invention may be any of aliphatic compounds, alicyclic compounds, aromatic compounds and heterocyclic compounds. In view of a high gas-barrier property, among these resins, preferred are epoxy resins containing aromatic moieties in a molecule thereof, and more preferred are epoxy resins containing the above skeleton structure represented by the formula (1) in a molecule thereof.

Specific examples of such an epoxy resin include epoxy resins containing glycidylamine moieties derived from m-xylylenediamine, epoxy resins containing glycidylamine moieties derived from 1,3-bis(aminomethyl)cyclohexane, epoxy resins containing glycidylamine moieties derived from diaminodiphenylmethane, epoxy resins containing glycidylamine moieties and/or glycidyl ether moieties derived from p-aminophenol, epoxy resins containing glycidyl ether moieties derived from bisphenol A, epoxy resins containing glycidyl ether moieties derived from bisphenol F, epoxy resins containing glycidyl ether moieties derived from phenol novolak, epoxy resins containing glycidyl ether moieties derived from resorcinol, or the like. Of these epoxy resins, preferred are epoxy resins containing glycidylamine moieties derived from m-xylylenediamine, epoxy resins containing glycidylamine moieties derived from 1,3-bis(aminomethyl) cyclohexane, epoxy resins containing glycidyl ether moieties derived from bisphenol F and epoxy resins containing glycidyl ether moieties derived from resorcinol.

Further, the epoxy resin used in the adhesive for laminates according to the present invention more preferably contains as a main component the epoxy resin containing glycidyl ether moieties derived from bisphenol F or the epoxy resin containing glycidylamine moieties derived from m-xylylenediamine, and most preferably contains the epoxy resin containing glycidylamine moieties derived from m-xylylenediamine.

In addition, the epoxy resin may also be used in the form of a mixture containing any two or more of the above-described epoxy resins at appropriate blending ratios, in order to improve various properties of the resultant product such as flexibility, impact resistance and wet heat resistance.

The epoxy resin used in the present invention is produced by reacting various alcohols, phenols and amines with epihalohydrin. For example, the epoxy resins containing glycidylamine moieties derived from m-xylylenediamine are produced by the addition reaction of epichlorohydrin to m-xylylenediamine.

Here, the above glycidylamine moieties include mono-, di-, tri- and/or tetra-glycidylamine moieties that can be substituted with four hydrogen atoms of diamine in the xylylenediamine. The ratio between the mono-, di-, tri- and/or tetra-glycidylamine moieties can be altered by changing the ratio between m-xylylenediamine and epichlorohydrin to be reacted. For example, epoxy resins containing mainly tetra-glycidylamine moieties are obtained by the addition reaction in which about 4 mol of epichlorohydrin is added to one mol of m-xylylenediamine.

More specifically, the epoxy resin used in the present invention is synthesized by reacting various alcohols, phenols and amines with an excess amount of epihalohydrin in the presence of an alkali such as sodium hydroxide at a temperature of 20 to 140° C. and preferably 50 to 120° C. for the alcohols and phenols, and 20 to 70° C. for the amines, and then separating the resultant alkali halide from the reaction mixture.

The number-average molecular weight of the thus produced epoxy resin varies depending upon the molar ratio of epichlorohydrin to various alcohols, phenols and amines, and is about 80 to 4,000, preferably about 200 to 1,000 and more preferably about 200 to 500.

(Epoxy Resin-Curing Agent)

The epoxy resin-curing agent used in the adhesive for laminates according to the present invention may be any of aliphatic compounds, alicyclic compounds. aromatic compounds and heterocyclic compounds. Namely, as the epoxy resin-curing agent, there may be used those ordinarily used for curing epoxy resins such as polyamines, phenols, acid anhydrides and carboxylic acids. The epoxy resin-curing agent may be appropriately selected according to applications of the resultant laminated film as well as its properties required for the applications.

Specific examples of the polyamines as the epoxy resin-curing agent include aliphatic amines such as ethylenediamine, diethylenetriamine, triethylenetetramine and tetraethylenepentamine; aromatic ring-containing aliphatic amines such as m-xylylenediamine and p-xylylenediamine; alicyclic amines such as 1,3-bis(aminomethyl)cyclohexane, isophoronediamine and norbornanediamine; and aromatic amines such as diaminodiphenylmethane and m-phenylenediamine.

Further, as the epoxy resin-curing agent, there may also be used epoxy resins produced using these polyamines as raw materials, or modified reaction products of these polyamines with a monoglycidyl compound, modified reaction products of these polyamines with $C_2$ to $C_4$ alkyleneoxide, addition products of these polyamines with epichlorohydrin, reaction products of these polyamines with a polyfunctional compound having at least one acyl group which is capable of forming amido moieties and, as a result, an oligomer by the reaction with the polyamines, reaction products of these polyamines with a polyfunctional compound having at least one acyl group which is capable of forming amido moieties and, as a result, an oligomer by the reaction with the polyamines, and a monocarboxylic acid and/or its derivative, or the like.

Examples of the phenols include poly-substituted monomers such as catechol, resorcinol and hydroquinone, resol-type phenol resins or the like.

In addition, as the acid anhydrides or carboxylic acids, there may be used aliphatic acid anhydrides such as dodecenyl succinic anhydride and poly-adipic anhydride; alicyclic acid anhydrides such as (methyl)tetrahydrophthalic anhydride and (methyl)hexahydrophthalic anhydride; aromatic acid anhydrides such as phthalic anhydride, trimellitic anhydride and pyromellitic anhydride; corresponding carboxylic acids of these anhydrides; or the like.

In view of a high bas-barrier property of the obtained cured product, of these epoxy resin-curing agents, preferred are epoxy resin-curing agents containing aromatic moieties in a molecule thereof, and more preferred are epoxy resin-curing agents having a skeleton structure represented by the foregoing formula (1) in a molecule thereof.

More specifically, as the epoxy resin-curing agents, there are more preferably used m-xylylenediamine or p-xylylenediamine, as well as epoxy resins produced using these polyamines as raw materials, or modified reaction products of these polyamines with a monoglycidyl compound, modified reaction products of these polyamines with a $C_2$ to $C_4$ alkyleneoxide, addition products of these polyamines with epichlorohydrin, reaction products of these polyamines with a polyfunctional compound having at least one acyl group which is capable of forming amido moieties and, as a result, an oligomer by the reaction with the polyamines, reaction products of these polyamines with a polyfunctional compound having at least one acyl group which is capable of forming amido moieties and, as a result, an oligomer by the reaction with the polyamines, and a monocarboxylic acid and/or its derivative, or the like.

In view of a high gas-barrier property and a good adhesion to various film materials, the epoxy resin-curing agent is especially preferably composed of reaction products of the following components (A) and (B), or reaction products of the following components (A), (B) and (C):

(A) m-xylylenediamine and/or p-xylylenediamine;

(B) a polyfunctional compound having at least one acyl group which is capable of forming amido moieties and, as a result, an oligomer by the reaction with the polyamines; and (C) a $C_1$ to $C_8$ monocarboxylic acid and/or its derivative.

Examples of the polyfunctional compound having at least one acyl group which is capable of forming amido moieties and, as a result, an oligomer by the reaction with the polyamines, include carboxylic acids such as acrylic acid, methacrylic acid, maleic acid, fumaric acid, succinic acid, malic acid, tartaric acid, adipic acid, isophthalic acid, terephthalic acid, pyromellitic acid and trimellitic acid; derivatives of these carboxylic acids such as esters, amides, acid anhydrides and acid chlorides thereof, or the like. Of these polyfunctional compounds, preferred are acrylic acid, methacrylic acid and derivatives thereof.

Also, the $C_1$ to $C_8$ monocarboxylic acid such as formic acid, acetic acid, propionic acid, butyric acid, lactic acid, glycolic acid and benzoic acid, or its derivative such as esters, amides, acid anhydrides and acid chlorides of these acids together with the above polyfunctional compound may be reacted with the polyamine as the starting material. The amido moieties introduced into the epoxy resin-curing agent by the reaction have a high coagulation force. Therefore, when such amido moieties are present at a high content in the epoxy resin-curing agent, the resultant adhesive layer can reveal a higher oxygen-barrier property and a good adhesion strength to various film materials.

The molar ratio between the components (A) and (B) to be reacted, or between the components (A), (B) and (C) to be reacted may be adjusted such that the ratio of the number of reactive functional groups contained in the component (B) to the number of amino groups contained in the component (A), or the ratio of the total number of reactive functional groups contained in the components (B) and (C) to the number of amino groups contained in the component (A), is preferably in the range of 0.3 to 0.97.

When the above ratio of the reactive functional groups is less than 0.3, a sufficient amount of amido groups are not produced in the epoxy resin-curing agent, so that the resultant cured product may fail to show a high gas-barrier property and a good adhesion strength to various film materials. In addition, since the content of residual volatile molecules in the epoxy resin-curing agent increases, the resultant cured product tends to suffer from generation of malodor. Further, since the content of hydroxyl groups in the cured product which are produced by the reaction between epoxy groups and amino groups also increases, the resultant cured product tends to be considerably deteriorated in oxygen-barrier property under high-humidity environmental conditions.

On the other hand, when the ratio of the reactive functional groups exceeds 0.97, the amount of amino groups in the epoxy resin-curing agent which can be reacted with the epoxy resin becomes small, so that the resultant cured product may fail to reveal excellent impact resistance and heat resistance, and also tends to be deteriorated in solubility in various organic solvent and water.

In order to obtain a cured product capable of showing a high gas-barrier property and a high adhesion strength, preventing the generation of malodor therefrom and revealing a high oxygen-barrier property under high-humidity environmental conditions, the molar ratio of the polyfunctional compound to the polyamine component is more preferably in the range of 0.67 to 0.97. Further, in view of a still higher adhesion strength to various film materials, the epoxy resin-curing agent used in the present invention preferably contains the amido groups in an amount of at least 6% by weight based on the total weight of the curing agent.

A laminated film produced using the adhesive for laminates according to the present invention preferably has an initial tacking force of 30 g/15 mm or greater, more preferably 40 g/15 mm or greater and most preferably 50 g/15 mm or greater as measured between film materials thereof by subjecting the laminated film to T-peel test at a peel velocity of 300 mm/min immediately after the lamination. If the initial tacking force between the respective film materials of the laminated film is insufficient, the laminated film tends to suffer from problems such as tunneling and winding disorder of the film upon winding-up thereof.

In order to allow the laminated film to reveal a high tackiness between the film materials thereof, for example, the reaction product of m-xylylenediamine or p-xylylenediamine with the polyfunctional compound having at least one acyl group which is capable of forming amido moieties and, as a result, an oligomer by the reaction with the polyamines, as the epoxy resin-curing agent, is controlled in reaction ratio such that the molar ratio of the polyfunctional compound to the polyamine component is in the range of 0.6:1 to 0.97:1, preferably 0.8:1 to 0.97 and more preferably 0.85:1 to 0.97:1. In addition, it is preferable to use such an epoxy resin-curing agent composed of the oligomer as the above reaction product which is increased in its average molecular weight.

The more preferred epoxy resin-curing agent is a reaction product of m-xylylenediamine with acrylic acid, methacrylic acid and/or a derivative thereof. The reaction molar ratio of the acrylic acid, methacrylic acid and/or a derivative thereof to m-xylylenediamine is preferably in the range of 0.8:1 to 0.97:1.

(Adhesive for Laminates)

In the adhesive for laminates according to the present invention, the epoxy resin and the epoxy resin-curing agent as main components of the adhesive may be blended at standard ratios that are generally used for producing an epoxy resin cured product by the reaction between the epoxy resin and epoxy resin-curing agent. More specifically, the ratio of the number of active hydrogen atoms in the epoxy resin-curing agent to the number of epoxy groups in the epoxy resin is in the range of 0.5:1 to 5.0:1. When the above ratio is less than 0.5:1, the resultant cure product tends to be deteriorated in gas-barrier property due to residual unreacted epoxy groups. When the ratio exceeds 5.0:1, the resultant cured product tends to be deteriorated in wet heat resistance due to residual unreacted amino group. In particular, in view of gas-barrier property and wet heat resistance of the resultant cured product, the equivalent ratio of active hydrogen atoms in the epoxy resin-curing agent to epoxy groups in the epoxy resin (active hydrogen atoms/epoxy group) is more preferably in the range of 0.8:1 to 3.0:1 and most preferably 0.8:1 to 1.4:1.

Further, in order to allow the resultant cured product to show a high oxygen-barrier property under high-humidity environmental conditions, the equivalent ratio of active hydrogen atoms in the epoxy resin-curing agent to epoxy groups in the epoxy resin is preferably controlled to the range of 0.8:1 to 1.4:1.

The above epoxy resin composition of the present invention may optionally contain thermosetting resin compositions such as polyurethane-based resin compositions, polyacrylic resin compositions and polyurea-based resin compositions according to the requirements unless the addition thereof adversely affects the effects of the present invention.

The adhesive for laminates according to the present invention may also optionally contain a wetting agent such as silicone and acrylic compounds according to the requirements to assist wetting of a surface of various film materials upon applying the adhesive thereto. Examples of the suitable wetting agent include BYK331, BYK333, BYK348 and BYK381 available from BYK Chemie GmbH, etc. The wetting agent is preferably added in an amount of 0.01% by weight to 2.0% by weight based on the total weight of the adhesive composition.

The adhesive for laminates according to the present invention may also optionally contain a tackifier such as xylene resins, terpene resins, phenol resins and rosin resins in accordance with the requirements in order to enhance its tackiness to various film materials immediately after applying the adhesive to the surface of the respective film materials. The tackifier is preferably added in an amount of 0.01% by weight to 5.0% by weight based on the total weight of the adhesive composition.

In addition, the adhesive for laminates according to the present invention may also contain an inorganic filler such as silica, alumina, mica, talc, aluminum flakes and glass flakes in order to enhance various properties such as gas-barrier property, impact resistance and heat resistance of an adhesive layer formed therefrom.

In view of transparency of the resultant film, the inorganic filler is preferably in the form of a flat plate. The inorganic filler is preferably added in an amount of 0.01% by weight to 10.0% by weight based on the total weight of the adhesive composition.

Further, the adhesive for laminates according to the present invention may also optionally contain an oxygen-capturing compound according to requirements. Examples of the oxygen-capturing compound include low-molecular weight organic compounds capable of reacting with oxygen such as hindered phenols, vitamin C, vitamin E, organophosphorus compounds, gallic acid and pyrogallol, transition metal compounds containing metals such as cobalt, manganese, nickel, iron and copper, or the like.

In addition, the adhesive for laminates according to the present invention may also contain a coupling agent such as silane coupling agents and titanium coupling agents in order to enhance the adhesive property of an adhesive layer formed therefrom to various film materials such as plastic films, metal foils and papers. The coupling agent is preferably added in an amount of 0.01% by weight to 5.0% by weight based on the total weight of the adhesive composition.

(Film Materials)

Examples of the film materials to be laminated by the adhesive of the present invention include polyolefin-based films made of low-density polyethylene, high-density polyethylene, linear low-density polyethylene, polypropylene, etc., polyester-based films made of polyethylene terephthalate, polybutylene terephthalate, etc., polyamide-based films made of nylon 6, nylon 6.6, m-xylyleneadipamide (N-MXD6), etc., polyacrylonitrile-based films, poly(meth) acrylic films, polystyrene-based films, polycarbonate-based films, ethylene-vinyl alcohol copolymer-based films, polyvinyl alcohol-based films, papers such as carton, metal foils such as aluminum foils and copper foils, films obtained by coating these film materials with various polymers such as polyvinylidene chloride (PVDC) resins, polyvinyl alcohol resins, ethylene-vinyl alcohol (EVOH) copolymer-based resins and acrylic resins, films on which various inorganic compounds or metals such as silica, alumina and aluminum are vapor-deposited, films in which inorganic fillers, etc., are dispersed, oxygen-capturing films, or the like. Also, the above various polymers to be coated on the film materials may contain inorganic fillers dispersed therein. Examples of such inorganic fillers include silica, alumina, mica, talc, aluminum flakes, glass flakes or the like. Of these inorganic fillers, preferred are phyllosilicates such as montmorillonite. These inorganic fillers may be dispersed in the polymers by known methods such as extrusion-kneading and mixing-dispersion in resin solutions. In order to impart an oxygen-capturing property to the films, for example, such a composition containing oxygen-reactive low-molecular weight organic compounds such as hindered phenols, vitamin C, vitamin E, organophosphorus compounds, gallic acid and pyrogallol, transition metal compounds containing metals such as cobalt, manganese, nickel, iron and copper, or the like, may be used as a part of the film materials.

The thickness of these film materials is about 10 to 300 μm and preferably about 10 to 100 μm in view of practical use thereof. Plastic films used as the film materials may be monoaxially or biaxially stretched.

The surface of these film materials is preferably subjected to various surface treatments such as flame treatment and corona discharge treatment, if desired, in order to form thereon an adhesive layer that is free from defects such as break and repelling. These treatments can promote a good adhesion of the adhesive layer to various film materials. Further, after subjecting the film materials to an appropriate surface treatment, a printed layer may be provided on the surface of the film materials, if desired. The printed layer may be produced by ordinary printing apparatuses used for printing on conventional polymer films, such as gravure printing machines, flexographic printing machines and offset printing machines. As ink that forms the printed layer, there may also be employed various inks used for forming a printed layer on conventional polymer films which are composed of pigments such as azo-based pigments and phthalocyanine-based pigments, resins such as rosins, polyamides and polyurethanes, and a solvent such as methanol, ethyl acetate and methyl ethyl ketone.

Among these film materials, the flexible polymer film layer serving as the sealant layer is preferably selected from polyolefin-based films such as polyethylene film, polypropylene film and ethylene-vinyl acetate copolymer film in view of a good heat sealability thereof. These films have a thickness of about 10 to 300 μm and preferably about 10 to 100 μm in view of practical use thereof, and may also be subjected to various surface treatments such as flame treatment and corona discharge treatment.

(Laminating Method)

Various film materials may be laminated using the adhesive for laminates according to the present invention by known laminating methods such as dry lamination, non-solvent lamination and extrusion lamination.

The laminating method in which the adhesive for laminates according to the present invention is applied onto the film materials for laminating these film materials therethrough may be conducted at a concentration of the adhesive composition and a temperature which are sufficient to obtain an epoxy resin cured product as the adhesive layer. The concentration of the adhesive composition and the temperature may vary depending upon starting materials and laminating method as selected. More specifically, the concentration of the adhesive composition can be variously changed over a range of from the condition where no solvent is used to the condition where the composition is diluted to about 5% by weight dilute solution using a certain suitable organic solvent and/or water, according to kinds and molar ratios of the selected raw materials, laminating method, etc.

Examples of the suitable organic solvent include non-aqueous solvents such as toluene, xylene and ethyl acetate; glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol; alcohols such as methanol, ethanol, 1-propanol, 2-propanol, 1-butanol and 2-butanol; aprotonic polar solvents such as N,N-dimethylformamide, N,N-dimethylacetamide, dimethylsulfoxide and N-methylpyrrolidone; or the like. Of these solvents, preferred are relatively low-boiling solvents such as methanol, ethyl acetate and 2-propanol.

The adhesive using the solvent may be dried after coating over a broad temperature range of from room temperature to about 140° C. to remove the solvent therefrom.

The adhesive composition may be applied onto the film materials by any coating methods ordinarily used for this purpose, such as roll coating, spray coating, air-knife coating, dip coating and brush coating. Of these methods, preferred are roll coating and spray coating. For example, there may be used the same roll coating and spray coating techniques and facilities as used for applying a polyurethane-based adhesive component onto the film materials to form a laminated film.

Next, specific procedures used in the respective laminating methods are explained below.

In the dry lamination method, immediately after a dilute solution prepared by dissolving the adhesive for laminates according to the present invention in an organic solvent and/or water is applied onto the surface of a film material as a substrate using rolls such as gravure rolls and then dried to remove the solvent therefrom, another film material is laminated thereon by nip rolls, etc., to form a laminated film. In this case, it is preferred that the thus obtained laminated film is aged at a temperature of from room temperature to 60° C. for a predetermined period of time to complete the curing reaction. When the aging is performed for the predetermined period of time, it is possible to produce an epoxy resin cured reaction product revealing a high gas-barrier property at a sufficient reaction rate.

In the non-solvent lamination method, immediately after the adhesive for laminates according to the present invention which is previously heated to a temperature of about 40° C. to 100° C. is applied onto the surface of a film material as a substrate using rolls such as gravure rolls which are also heated to a temperature of 40° C. to 120° C., another film material is laminated thereon by nip rolls, etc., to form a laminated film. In this case, it is also preferred that the thus obtained laminated film is aged for a predetermined period of time similarly to the above dry lamination method.

In the extrusion lamination method, a dilute solution prepared by dissolving the epoxy resin and the epoxy resin-curing agent as main components of the adhesive for laminates according to the present invention in an organic solvent and/or water, as an adhesive assistant (anchor coat agent), is applied over the surface of a film material as a substrate using rolls such as gravure rolls. Then, after the resultant coated film material is dried at a temperature of from room temperature to 140° C. to remove the organic solvent therefrom and conduct a curing reaction thereof, a polymer material melted in an extruder is extruded and laminated thereon to form a laminated film. As the polymer material to be melt-laminated, polyolefin-based resins such as low-density polyethylene resin, linear low-density polyethylene resin and ethylene-vinyl acetate copolymer resin may be preferably employed.

In the co-extrusion lamination method, molten polymer materials and the adhesive for laminates according to the present invention are filled into an extruder, and extruded therefrom into a plurality of layers through a cylindrical die or a T-die to form a laminated film. The structure of the laminated film and kinds of polymer materials used may vary depending upon applications of the resultant film and properties required therefor. Specific examples of the structure of the laminated film include, but are not limited to, a three-layer structure composed of polymer material layer/adhesive layer/polymer material layer, a five layer structure composed of polymer material layer/adhesive layer/polymer material layer/adhesive layer/polymer material layer, or the like. Also, the adhesive for laminates according to the present invention may be used in at least one adhesive layer of the laminated film. In this case, other adhesive layers of the laminated film may be made of an ordinary polyurethane-based adhesive, etc.

Further, in addition to the above laminating methods, there may be used such a method in which the adhesive for laminates according to the present invention is injected between adjacent two film or sheet materials to form a laminated film.

These laminating methods may be used in combination with other ordinary laminating methods, if desired, and the layer structure of the obtained laminated film may vary depending upon applications and configurations thereof.

The adhesive layer obtained after applying the adhesive for laminates according to the present invention over various film materials, followed by drying, lamination and heat-treatment, has a thickness of 0.1 to 100 μm and preferably 0.5 to 10 μm in view of practical use of the resultant laminated film. When the thickness of the adhesive layer is less than 0.1 μm, the adhesive layer may fail to exhibit a sufficient gas-barrier property and adhesion property. On the other hand, when the thickness of the adhesive layer exceeds 100 μm, it may be difficult to form an adhesive layer having a uniform thickness.

(Laminated Film)

The adhesive for laminates according to the present invention can reveal not only a good adhesion property to various film materials but also a high gas-barrier property over a broad range of from low-humidity condition to high-humidity condition. Therefore, the laminated film produced using the adhesive for laminates according to the present invention can show an extremely high gas-barrier property without using an ordinarily used gas-barrier material such as PVDC coating layer, polyvinyl alcohol (PVA) coating layer, ethylene-vinyl alcohol copolymer (EVOH) film layer, m-xylyleneadipamide film layer and inorganic deposited film layer on which alumina ($AL_2O_3$), silica (Si), etc., is vapor-deposited. In addition, by using the adhesive for laminates according to the present invention as an adhesive for laminating the conventional gas-barrier material and a sealant material, the obtained laminated film can be more remarkably improved in gas-barrier property.

Also, gas-barrier films such as saponified ethylene-vinyl acetate copolymer (EVOH)-based films, polyvinyl alcohol-based films, polyvinyl alcohol-coated films, inorganic filler-dispersed polyvinyl alcohol-coated films and m-xylyleneadipamide (N-MXD6) films generally tend to be deteriorated in gas-barrier property under high-humidity condition. However, when the adhesive for laminates according to the present invention is used to form a laminated film including these gas-barrier films, the resultant laminated film can show an improved gas-barrier property even under the high-humidity condition.

Further, since the epoxy resin cured product forming the adhesive layer in the laminated film of the present invention is excellent in toughness and wet heat resistance, it also becomes possible to produce a gas-barrier laminated film that is excellent in impact resistance, resistance to boiling treatment and resistance to retort treatment.

(Multi-Layer Packaging Material)

The laminated film produced using the adhesive for laminates according to the present invention may be employed as a multi-layer packaging material for the purpose of protecting foods, drugs, etc. When the laminated film of the present invention is used as such a multi-layer packaging material, the layer structure thereof may vary depending upon contents as well as environmental conditions and configurations upon use. More specifically, the laminated film of the present invention may be directly used as the multi-layer packaging material. Alternatively, an oxygen-absorbing layer, a thermoplastic resin film layer, a paper layer, a metal foil layer, etc., may be further laminated on the laminated film of the present invention, if desired. In the latter case, the lamination may be performed using either the adhesive for laminates according to the present invention or the other adhesives or anchor coat agents.

(Packaging Bag)

Next, packaging bags made of a soft packaging bag which is produced from the above multi-layer packaging material are explained. The packaging bags made of such a soft packaging bag, etc., can be produced by overlapping the multi-layer packaging materials such that heat-sealable resin layers thereof face each other, and then heat-sealing the peripheral edge portions of the overlapped multi-layer packaging materials to form a sealed portion. As the bag-making method, there may be used, for example, such a method in which the multi-layer packaging material is folded up or the multi-layer packaging materials are overlapped so as to face inner layers thereof to each other, and then a peripheral edge portion of the thus folded packaging material or the overlapped packaging materials is heat-sealed into various heat-seal configurations such as side-sealed type, two side-sealed type, three side-sealed type, four side-sealed type, envelope-sealed type, butt-seam sealed type (pillow-sealed type), pleat-sealed type, flat bottom-sealed type, square bottom-sealed type and gazette type. The structure of the packaging bag may vary depending upon contents as well as environmental conditions and configurations upon use. In addition, the packaging bag may be in the form of a self-standing bag (standing pouch) or the like. The heat-sealing may be performed by known methods such as bar sealing, rotating roll sealing, belt sealing, impulse sealing, high-frequency sealing and ultrasonic sealing.

The packaging bag is filled with contents through an opening thereof, and then the opening is closed by heat-sealing to produce a packaged product using the packaging bag of the present invention.

Examples of the contents to be filled in the packaging bag include confectioneries such as rice cookies, bean cakes, nuts, biscuits and cookies, wafers, marshmallows, pies, rare cakes, candies and snacks; staples such as breads, snack noodles, instant noodles, dried noodles, pastas, sterile packaged cooked rice, rice porridges, rice gruel, packaged rice cakes and cereal foods; agricultural processed foodstuffs such as pickles, boiled beans, fermented soybeans, Miso, frozen bean curd, bean curd, edible fungus (Na-me-ta-ke), Konjak, processed wild plant products, jams, peanut creams, salads, frozen vegetables and processed potato products; processed livestock products such as hams, bacons, sausages, processed chicken products and corn beefs; processed marine products such as fish meat hams and sausages, fish-paste products, boiled fish pastes, toasted laver, soy-boiled foods, dried bonitos, salted fish guts, smoked salmons and mustard cod roe; sarcocarps such as peach, orange, pineapple, apple, pear and cherry; vegetables such as cone, asparagus, mushroom, onion, carrot, radish and potato; cooked foodstuffs, for example, frozen and chilled daily dishes such as typically hamburgers, meat balls, fried sea foods, dumpling stuffed with minced pork, and croquettes; dairy products such as butter, margarine, cheese, cream, instant creamy powder and childcare conditioned powdered milk; and other foodstuffs such as liquid seasonings, retort curry and pet foods. In addition, the packaging bag can also be used as a packaging material for tobaccos, disposable thermal body pads, medicines, cosmetics, etc.

The present invention will be described in more detail by reference to the following examples. However, it should be noted that the following examples are only illustrative and not intended to limit the invention thereto.

(Evaluation Methods)

Oxygen Permeability ($cc/m^2 \cdot day \cdot atm$)

The oxygen permeability of the laminated film was measured at 23° C. and a relative humidity of 60% using an oxygen permeability measuring device "OX-TRAN 10/50A" produced by Modern Control Inc. Regarding the oxygen permeability under high-humidity conditions, it was measured at 23° C. and a relative humidity of each of 80% and 90%.

Oxygen Permeability after Gelbor Treatment ($cc/m^2 \cdot day \cdot atm$)

The impact resistance of the laminated film was evaluated after imposing a 360° twist by Gelbor Flex Tester (produced by Rigaku Kogyo Sha Co., Ltd.) for 500 times, to the laminated film, followed by measuring the oxygen permeability thereof under the condition of the temperature at 23° C. and a relative humidity of 60%.

Oxygen Permeability After Retort Treatment ($cc/m^2 \cdot day \cdot atm$)

The laminated film was retort-treated at 121° C. for 30 minutes using Retort Food Autoclave produced by Tomy Co., Ltd., and the oxygen permeability thereof was measured at 23° C. and a relative humidity of 60%.

Water Vapor Permeability ($g/m^2 \cdot day$)

The water vapor permeability of the laminated film was measured at 40° C. and a relative humidity of 90% in accordance with a method prescribed in JIS Z-0208.

Appearance

The appearance of the laminated film was visually observed and evaluated.

Initial Tacking Force (g/15 mm)

The laminated film was subjected to T-peel test immediately after the lamination to measure the tacking force thereof at a peel velocity of 300 mm/min.

Lamination Strength (g/15 mm)

In accordance with a method prescribed in JIS K-6854, the laminated film was subjected to T-peel test to measure the lamination strength thereof at a peel velocity of 100 mm/min.

Heat-Seal Strength (kg/15 mm)

The laminated film was heat-sealed at 160° C. under a load of 2 $kg/cm^2$ for one second using a heat-seal treatment apparatus (heat gradient tester) produced by Toyo Seiki Seisakusho Co., Ltd., and a test piece of the laminated film was subjected to tensile test at a pulling velocity of 300 mm/min.

(Preparation of Epoxy Resin-Curing Agent)

Epoxy Resin-Curing Agent A

One mole of m-xylylenediamine was charged into a reactor and heated to 60° C. under a nitrogen flow, and then 0.80 mol of methyl acrylate was dropped into the reactor spending one hour. After completion of the dropping, the reaction mixture was stirred at 120° C. for one hour, and further heated to 160° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent A.

Epoxy Resin-Curing Agent B

One mole of m-xylylenediamine was charged into a reactor and heated to 60° C. under a nitrogen flow, and then 0.90 mol of methyl acrylate was dropped into the reactor spending one hour. After completion of the dropping, the reaction mixture was stirred at 120° C. for one hour, and further heated to 160° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent B.

Epoxy Resin-Curing Agent C

One mole of m-xylylenediamine was charged into a reactor and heated to 60° C. under a nitrogen flow, and then 0.95 mol of methyl acrylate was dropped into the reactor spending one hour. After completion of the dropping, the reaction mixture was stirred at 120° C. for one hour, and further heated to 160° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent C.

Epoxy Resin-Curing Agent D

One mole of m-xylylenediamine was charged into a reactor and heated to 120° C. under a nitrogen flow, and then 0.33 mol of methyl acrylate was dropped into the reactor spending one hour. The obtained reaction mixture was stirred at 120° C. for 0.5 hour. Further, after 0.33 mol of malic acid was slowly added to the reactor, the obtained reaction mixture was stirred for 0.5 hour and then heated to 180° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent D.

Epoxy Resin-Curing Agent E

One mole of m-xylylenediamine was charged into a reactor and heated to 120° C. under a nitrogen flow, and then 0.67 mol of methyl acrylate was dropped into the reactor spending one hour. The obtained reaction mixture was stirred at 120° C. for 0.5 hour. Further, after 0.33 mol of acetic acid was dropped into the reactor for 0.5 hour, the obtained reaction mixture was stirred for one hour and then heated to 180° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent E.

Epoxy Resin-Curing Agent F

One mole of m-xylylenediamine was charged into a reactor and heated to 60° C. under a nitrogen flow, and then 0.93 mol of methyl acrylate was dropped into the reactor spending one hour. After completion of the dropping, the reaction mixture was stirred at 120° C. for one hour, and further heated to 160° C. for 3 hours while distilling off methanol as produced. Then, the resultant reaction solution was cooled to 100° C., and a suitable amount of methanol was added to the solution so as to adjust the solid content thereof to 70% by weight, thereby obtaining an epoxy resin-curing agent F.

EXAMPLE 1

A 1:1 methanol/ethyl acetate solution (solid content: 30% by weight) containing 50 parts by weight of an epoxy resin having glycidylamine moieties derived from m-xylylenediamine ("TETRAD-X" available from Mitsubishi Gas Chemical Co., Ltd.) and 115 parts by weight of the epoxy resin-curing agent A was mixed with 0.02 part by weight of an acrylic wetting agent "BYK381" available from BYK Chemie GmbH, and intimately stirred together to prepare a coating solution.

The thus obtained coating solution was applied over the surface of a 20 μm-thick stretched polypropylene film with the use of a bar coater No. 3 in a coating amount of 3 g/m$^2$ (solid content), dried at 85° C. for 10 seconds, laminated with a 30 μm-thick polypropylene film using nip rolls, and then aged at 35° C. for one day to obtain a laminated film. It was confirmed that the content of the skeleton structure represented by the formula (1) in the resultant adhesive layer (epoxy resin cured product) was 59.5% by weight. The thus obtained laminated film was tested to evaluate a gas barrier property (oxygen permeability and water vapor permeability at a relative humidity of 60%) as well as an initial tacking force and a lamination strength immediately after lamination. The results are shown in Table 1.

EXAMPLE 2

The same procedure as in EXAMPLE 1 was carried out except for using 142 parts by weight of the epoxy resin-curing agent B instead of the epoxy resin-curing agent A, to prepare a laminated film. As a result, it was confirmed that the content of the skeleton structure represented by the formula (1) in the adhesive layer of the laminated film was 59.8% by weight. The thus obtained laminated film was tested to evaluate a gas-barrier property, etc. thereof. The results are shown in Table 1.

EXAMPLE 3

The same procedure as in EXAMPLE 1 was carried out except for using 163 parts by weight of the epoxy resin-curing agent C instead of the epoxy resin-curing agent A, to prepare a laminated film. As a result, it was confirmed that the content of the skeleton structure represented by the formula (1) in the adhesive layer of the laminated film was 60.2% by weight. The thus obtained laminated film was tested to evaluate a gas-barrier property, etc. thereof. The results are shown in Table 1.

EXAMPLE 4

The same procedure as in EXAMPLE 1 was carried out except for using 110 parts by weight of the epoxy resin-curing agent D instead of the epoxy resin-curing agent A, to prepare a laminated film. As a result, it was confirmed that the content of the skeleton structure represented by the formula (1) in the adhesive layer of the laminated film was 57.4% by weight.

The thus obtained laminated film was tested to evaluate a gas-barrier property, etc. thereof. The results are shown in Table 1.

EXAMPLE 5

The same procedure as in EXAMPLE 1 was carried out except for using 140 parts by weight of the epoxy resin-curing agent E instead of the epoxy resin-curing agent A, to prepare a laminated film. As a result, it was confirmed that the content of the skeleton structure represented by the formula (1) in the adhesive layer of the laminated film was 59.4% by weight. The thus obtained laminated film was tested to evaluate a gas-barrier property, etc. thereof. The results are shown in Table 1.

EXAMPLE 6

The same procedure as in EXAMPLE 1 was carried out except for using 132 parts by weight of the epoxy resin-curing agent F instead of the epoxy resin-curing agent A, to prepare a laminated film. As a result, it was confirmed that the content of the skeleton structure represented by the formula (1) in the adhesive layer of the laminated film was 56.1% by weight.

The thus obtained laminated film was tested to evaluate a gas-barrier property, etc. there of. The results are shown in Table 1. In addition, the laminated film was tested for evaluating an oxygen permeability under high-humidity conditions, an oxygen permeability after Gelbor treatment, an oxygen permeability and appearance after retort treatment, and a heat-seal strength thereof The results are shown in Table 2.

EXAMPLE 7

The same procedure as in EXAMPLE 1 was carried out except for using 50 parts by weight of an epoxy resin having glycidyl ether moieties derived from bisphenol F ("EPICOAT 807" available from Japan Epoxy Resin Co., Ltd.) instead of TETRAD-X, and using 141 parts by weight of the epoxy resin-curing agent A, to prepare a laminated film. As a result, it was confirmed that the content of the skeleton structure represented by the formula (1) in the adhesive layer of the laminated film was 54.4% by weight. The thus obtained laminated film was tested to evaluate a gas-barrier property, etc. thereof. The results are shown in Table 1.

EXAMPLE 8

The same procedure as in EXAMPLE 6 was carried out except for using a 40 μm-thick linear low-density polyethylene film instead of the 30 μm-thick polypropylene film, to prepare a laminated film. The thus obtained laminated film was tested to evaluate a gas-barrier property, etc. thereof. The results are shown in Table 1.

EXAMPLE 9

The same procedure as in EXAMPLE 6 was carried out except for using a 15 μm-thick stretched nylon film instead of the 20 μm-thick stretched polypropylene film, to prepare a laminated film.

The thus obtained laminated film was tested to evaluate a gas-barrier property, etc. there of The results are shown in Table 1. In addition, the laminated film was tested for evaluating an oxygen permeability under high-humidity conditions, an oxygen permeability after Gelbor treatment, an oxygen permeability and appearance after retort treatment, and a heat-seal strength thereof. The results are shown in Table 2.

EXAMPLE 10

The same procedure as in EXAMPLE 6 was carried out except for using a 12 μm-thick polyethylene terephthalate film instead of the 20 μm-thick stretched polypropylene film, to prepare a laminated film.

The thus obtained laminated film was tested to evaluate a gas-barrier property, etc. thereof. The results are shown in Table 1. In addition, the laminated film was tested for evaluating an oxygen permeability under high-humidity conditions, an oxygen permeability after Gelbor treatment, an oxygen permeability and appearance after retort treatment, and a heat-seal strength thereof. The results are shown in Table 2.

EXAMPLE 11

The same procedure as in EXAMPLE 6 was carried out except for using a 50 gm-thick paper instead of the 20 μm-thick stretched polypropylene film and using a 40 μm-thick low-density polyethylene film instead of the 30 μm-thick polypropylene film, to prepare a laminated film. The thus obtained laminated film was tested to evaluate a gas-barrier property, etc. thereof. The results are shown in Table 1.

EXAMPLE 12

The same procedure as in EXAMPLE 6 was carried out except for using a 30 μm-thick aluminum foil instead of the 20 μm-thick stretched polypropylene film, to prepare a laminated film. The thus obtained laminated film was tested to evaluate a gas-barrier property, etc. thereof. The results are shown in Table 1.

EXAMPLE 13

The same procedure as in EXAMPLE 10 was carried out except for using a 15 gm-thick stretched nylon film instead of the 30 μm-thick polypropylene film, to prepare a laminated film. Further, the adhesive coating solution prepared in EXAMPLE 6 was applied over a surface of the nylon film layer of the thus obtained laminated film in a coating amount of 3 g/cm² in terms of its solid content, and dried at 85° C. for seconds. Then, a 40 μm-thick linear low-density polyethylene film was laminated on the obtained adhesive layer using nip rolls, and the resultant laminated film was aged at 35° C. for one day to prepare a laminated film having a layer structure of polyethylene terephthalate film/stretched nylon film/linear low-density polyethylene film.

The thus obtained laminated film was tested to evaluate a gas-barrier property, etc. thereof. The results are shown in Table 1. In addition, the laminated film was tested for evaluating an oxygen permeability under high-humidity conditions, an oxygen permeability after Gelbor treatment, an oxygen permeability and appearance after retort treatment, and a heat-seal strength thereof. The results are shown in Table 2.

Comparative Example 1

The same procedure as in EXAMPLE 1 was carried out except for using a polyurethane-based adhesive coating solution composed of an ethyl acetate solution (solid content: 30% by weight) containing 50 parts by weight of a polyether component ("TM-329" available from Toyo Morton Co., Ltd.) and 50 parts by weight of a polyisocyanate component ("CAT-8B" available from Toyo Morton Co., Ltd.) instead of the adhesive coating solution used in EXAMPLE 1, to prepare a laminated film. The thus obtained laminated film was tested to evaluate a gas-barrier property, etc. thereof. The results are shown in Table 1.

Comparative Example 2

The same procedure as in EXAMPLE 1 was carried out except for using 50 parts by weight of "EPICOAT 807" instead of TETRAD-X, and using 47 parts by weight of the epoxy resin-curing agent A, to prepare a laminated film. As a result, it was confirmed that the content of the skeleton structure represented by the formula (1) in the adhesive layer of the laminated film was 35.7% by weight. The thus obtained laminated film was tested to evaluate a gas-barrier property, etc. thereof. The results are shown in Table 1.

Comparative Example 3

The same procedure as in EXAMPLE 1 was carried out except for using 65 parts by weight of an amine-based curing agent as an addition product of m-xylylenediamine with epichlorohydrin at a molar ratio of about 2:1 ("GASKAMINE 328" available from Mitsubishi Gas Chemical Co., Ltd.) instead of the epoxy resin-curing agent A, to prepare a laminated film. As a result, it was confirmed that the content of the skeleton structure represented by the formula (1) in the adhesive layer of the laminated film was 61.4% by weight.

The thus obtained laminated film was tested to evaluate a gas-barrier property, etc. thereof. The results are shown in Table 1. In addition, the laminated film was tested for evaluating an oxygen permeability under high-humidity conditions, an oxygen permeability after Gelbor treatment, an oxygen permeability and appearance after retort treatment, and a heat-seal strength thereof. The results are shown in Table 2.

TABLE 1-1

| | Appearance | Oxygen permeability ($cc/m^2 \cdot day \cdot atm$) | Water vapor permeability ($g/m^2 \cdot day$) |
|---|---|---|---|
| Example 1 | Transparent | 8 | 4 |
| Example 2 | Transparent | 8 | 4 |
| Example 3 | Transparent | 10 | 4 |
| Example 4 | Transparent | 6 | 4 |
| Example 5 | Transparent | 8 | 4 |
| Example 6 | Transparent | 9 | 4 |
| Example 7 | Transparent | 14 | 4 |
| Example 8 | Transparent | 9 | 5 |
| Example 9 | Transparent | 7 | 12 |
| Example 10 | Transparent | 8 | 9 |
| Example 11 | — | 9 | 10 |
| Example 12 | — | 0.1 | 0.1 |
| Example 13 | Transparent | 4 | 7 |
| Comparative Example 1 | Transparent | Less than 1000 | 4 |
| Comparative Example 2 | Transparent | 68 | 4 |
| Comparative Example 3 | Transparent | 7 | 4 |

TABLE 1-2

| | Initial tacking force (g/15 mm) | Lamination strength (g/15 mm) f: PET film broke |
|---|---|---|
| Example 1 | 35 | 30 |
| Example 2 | 88 | 30 |
| Example 3 | 87 | 32 |
| Example 4 | 40 | 32 |
| Example 5 | 32 | 30 |
| Example 6 | 100 | 38 |
| Example 7 | 45 | 38 |
| Example 8 | 100 | 38 |
| Example 9 | 100 | 700 |
| Example 10 | 100 | 250f |
| Example 11 | 100 | 300 |
| Example 12 | 100 | 800 |
| Example 13 | 105 | 800 |
| Comparative Example 1 | 213 | 46 |
| Comparative Example 2 | 40 | 32 |
| Comparative Example 3 | 7 | 30 |

TABLE 2

| | Ex. 6 | Ex. 9 | Ex. 10 | Ex. 13 | Com. Ex. 6 |
|---|---|---|---|---|---|
| Oxygen permeability at 60% RH ($cc/m^2 \cdot day \cdot atm$) | 9 | 7 | 8 | 4 | 7 |
| Oxygen permeability at 80% RH ($cc/m^2 \cdot day \cdot atm$) | 14 | 12 | 13 | 7 | 14 |
| Oxygen permeability at 90% RH ($cc/m^2 \cdot day \cdot atm$) | 18 | 17 | 17 | 11 | 28 |
| Oxygen permeability after Gelbor treatment ($cc/m^2 \cdot day \cdot atm$) | 11 | 9 | 10 | 4 | 10 |
| Oxygen permeability after retort treatment ($cc/m^2 \cdot day \cdot atm$) | 14 | 10 | 12 | 7 | 18 |
| Appearance after retort treatment | Transparent | Transparent | Transparent | Transparent | Transparent |
| Heat-seal strength (kg/15 mm) | 2.6 | 3.3 | 3.1 | 2.6 | 2.6 |

EXAMPLE 14

The same procedure as in EXAMPLE 6 was carried out except for using a 15 μm-thick multi-layer stretched nylon film ("SUPERNIEL" available from Mitsubishi Chemicals Corp.; layer structure: nylon-6 (5 μm)/N-MXD6 (5 μm)/nylon-6 (5 μm)) instead of the 20 μm-thick stretched polypropylene film, and changing the amount of the coating solution applied to 4 $g/m^2$ (in terms of solid content), to prepare a laminated film. The thus obtained laminated film was tested to evaluate an oxygen permeability thereof. The results are shown in Table 3.

Comparative Example 4

The same procedure as in EXAMPLE 14 was carried out except for using the polyurethane-based adhesive coating solution used in COMPARATIVE EXAMPLE 1 instead of the adhesive coating solution used in EXAMPLE 14, and changing the amount of the coating solution applied to 2 $g/m^2$ (in terms of solid content), to prepare a laminated film. The thus obtained laminated film was tested to evaluate an oxygen permeability there of. The results are shown in Table 3.

EXAMPLE 15

The same procedure as in EXAMPLE 6 was carried out except for using a 15 μm-thick unstretched EVOH film (ethylene content: 32 mol %) instead of the 20 μm-thick stretched polypropylene film, and changing the amount of the coating solution applied to 4 g/m$^2$ (in terms of solid content), to prepare a laminated film. The thus obtained laminated film was tested to evaluate an oxygen permeability thereof. The results are shown in Table 3.

Comparative Example 5

The same procedure as in EXAMPLE 15 was carried out except for using the polyurethane-based adhesive coating solution used in COMPARATIVE EXAMPLE 1 instead of the adhesive coating solution used in EXAMPLE 15, and changing the amount of the coating solution applied to 2 g/m$^2$ (in terms of solid content), to prepare a laminated film. The thus obtained laminated film was tested to evaluate an oxygen permeability thereof. The results are shown in Table 3.

TABLE 3

|  | Ex. 14 | Ex. 15 | Com. Ex. 4 | Com. Ex. 5 |
|---|---|---|---|---|
| Oxygen permeability at 60% RH (cc/m$^2$ · day · atm) | 3 | 0.6 | 6 | 0.6 |
| Oxygen permeability at 80% RH (cc/m$^2$ · day · atm) | 5 | 4 | 8 | 6 |
| Oxygen permeability at 90% RH (cc/m$^2$ · day · atm) | 8 | 14 | 15 | 60 |

EXAMPLE 16

Two laminated films prepared in EXAMPLE 6 were overlapped so as to face their polypropylene film layers to each other, and the outer peripheral edge portions of the overlapped films were heat-sealed at three sides thereof to produce a three side-sealed type packaging bag having an opening on its upper side.

The thus produced packaging bag was filled with a nitrogen gas, and then closed by heat-sealing the opening side thereof. The closed packaging bag was preserved at 23° C. for one week in air under such an environmental condition that both inside and outside of the bag were exposed to 60% RH. Thereafter, the packaging bag was subjected to gas chromatography to measure an oxygen concentration inside of the bag, thereby determining an oxygen permeability of the laminated film. The results are shown in Table 4.

EXAMPLE 17

Two laminated films prepared in EXAMPLE 9 were overlapped so as to face their polypropylene film layers to each other, and the outer peripheral edge portions of the overlapped films were heat-sealed at three sides thereof to produce a three side-sealed type packaging bag having an opening on its upper side.

The thus produced packaging bag was subjected to the same procedure as in EXAMPLE 16 to measure an oxygen concentration inside of the bag and an oxygen permeability of the laminated film. The results are shown in Table 4.

EXAMPLE 18

Two laminated films prepared in EXAMPLE 10 were overlapped so as to face their polypropylene film layers to each other, and the outer peripheral edge portions of the overlapped films were heat-sealed at three sides thereof to produce a three side-sealed type packaging bag having an opening on its upper side.

The thus produced packaging bag was subjected to the same procedure as in EXAMPLE 16 to measure an oxygen concentration inside of the bag and an oxygen permeability of the laminated film. The results are shown in Table 4.

TABLE 4

|  | Oxygen concentration inside of bag (cc/bag · one week) | Oxygen permeability (cc/m$^2$ · day · atm) |
|---|---|---|
| Example 16 | 0.48 | 16 |
| Example 17 | 0.27 | 9 |
| Example 18 | 0.40 | 13 |

As is apparent from the measurement results shown in Table 4, the packaging bag of the present invention reveals a substantially excellent oxygen-barrier property. In addition, as is apparent from the results of evaluation of properties, the packaging bag of the present invention has excellent heat-seal strength and lamination strength. Therefore, the packaging bag of the present invention can be suitably used as a bag for packaging contents for which a high oxygen-barrier property is required, such as foods and medicines.

INDUSTRIAL APPLICABILITY

The adhesive for laminates according to the present invention can reveal not only a suitable adhesion property to various film materials but also a high gas-barrier property, so that it is possible to achieve a combined function as gas-barrier layer and adhesive layer by only one layer produced therefrom.

As a result, although the conventional packaging laminated film is required to separately provide a gas-barrier layer and an adhesive layer formed between the gas barrier layer and a sealant layer, the use of the adhesive for laminates according to the present invention makes it possible to obtain a laminated film for packaging material having a high gas-barrier property without separately forming a gas-barrier layer. Further, the adhesive for laminates according to the present invention may also be used as an adhesive layer for bonding the conventional gas-barrier film made of PVDC coating layer, polyvinyl alcohol (PVA) coating layer, ethylene-vinyl alcohol copolymer (EVOH) film layer, m-xylyleneadipamide film layer and inorganic deposited film deposited with alumina ($Al_2O_3$) or silica (Si) to a sealant layer, thereby enabling production of a laminated film revealing a more remarkably improved gas-barrier property. In addition, when the conventional gas-barrier films having such a problem that the gas-barrier property thereof is generally deteriorated under high-humidity conditions, are used in combination with the adhesive for laminates according to the present invention, it becomes possible to overcome the problem.

Also, the laminated film prepared using the adhesive for laminates according to the present invention as well as the packaging bag produced by forming the laminated film into a bag shape, are excellent in not only gas-barrier property such oxygen- barrier property or water vapor-barrier property but also lamination strength and heat-seal strength, and reveal suitable mechanical, chemical or physical strength, for example, excellent fastness properties such as heat resistance,. water resistance, aroma retention property, light resistance, chemical resistance, piercing resistance and various other properties. As a result, according to the present invention, there can be provided a packaging material capable of sufficiently protecting contents to be filled or packaged therein, for example, foods such as confectioneries, staples, processed agricultural products, processed livestock products, processed marine products, sarcocarps, vegetables, cooked foodstuffs such as frozen and chilled daily dishes and liquid seasonings; cosmetics; drugs; or the like, and exhibiting excellent storage and keeping stability, filling and packaging capabilities, etc.

What is claimed is:

1. An adhesive for laminates containing an epoxy resin composition comprising an epoxy resin containing glycidylamine moieties derived from m-xylylenediamine and an epoxy resin-curing agent, the epoxy resin composition being formed into an epoxy resin-cured product containing a skeleton structure represented by the formula (1):

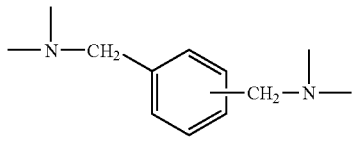

(1)

in an amount of at least 40% by weight,
wherein the epoxy resin-curing agent is a reaction product of m-xylylenediamine with at least one selected from the group consisting of acrylic acid, methacrylic acid and a derivative thereof,
wherein a blending ratio between the epoxy resin and the epoxy resin-curing agent in the epoxy resin composition is such that an equivalent ratio of active hydrogen contained in the epoxy resin-curing agent to epoxy groups contained in the epoxy resin falls within the range of 0.8:1 to 1.4:1, and
wherein a molar ratio of the at least one selected from the group consisting of acrylic acid, methacrylic acid and a derivative thereof to the m-xylylenediamine falls within a range of 0.8:1 to 0.97:1.

2. The adhesive according to claim 1, wherein the epoxy resin-curing agent contains amido groups in an amount of at least 6% by weight based on a total amount of the curing agent.

3. The adhesive according to claim 1, wherein a laminated film prepared using the adhesive has an initial tacking force of 30 g/15 mm or higher as measured between film materials thereof by subjecting the laminated film to T-peel test at a peel velocity of 300 mm/mm immediately after the lamination.

4. An adhesive assistant comprising the adhesive as defined in claim 1.

* * * * *